United States Patent [19]

Kinaga et al.

[11] Patent Number: 5,182,786

[45] Date of Patent: Jan. 26, 1993

[54] ACTIVE ENERGY BEAM-CURABLE COMPOSITION CONTAINING PARTICLES AND COATED OPTICAL FIBER

[75] Inventors: Yoshimasa Kinaga; Masao Ogawa, both of Kanagawa; Yoshihiro Kiyomura, Hiratsuka, all of Japan

[73] Assignee: Kansai Paint Co., Ltd., Amagasaki, Japan

[21] Appl. No.: 450,190

[22] Filed: Dec. 13, 1989

[30] Foreign Application Priority Data

Dec. 23, 1988 [JP] Japan .................. 63-325113

[51] Int. Cl.$^5$ .................. G02B 6/44; C08K 9/00; C08F 2/50; B32B 17/04
[52] U.S. Cl. .................. 385/128; 385/141; 522/78; 522/79; 522/80; 522/81; 522/82; 522/83; 428/378; 428/391; 428/394; 428/395; 523/200; 523/300; 523/202; 524/714; 524/847
[58] Field of Search .................. 522/78, 79, 80, 81, 522/82, 83; 428/378, 391, 394, 395; 523/200-217; 525/300; 524/847, 714; 350/96.23, 96.24, 96.29; 385/100, 114, 115, 144, 145, 128, 141

[56] References Cited

U.S. PATENT DOCUMENTS

| | | | |
|---|---|---|---|
| 3,993,798 | 11/1976 | Brose et al. | 522/78 |
| 4,218,294 | 8/1980 | Brack | 522/8 |
| 4,243,702 | 1/1981 | Walsh | 522/79 |
| 4,427,823 | 1/1984 | Inagaki et al. | 522/83 |
| 4,472,201 | 9/1984 | Ansel et al. | 522/79 |
| 4,525,026 | 6/1985 | Elion | 385/128 |
| 4,603,153 | 7/1986 | Sobajma et al. | 523/209 |
| 4,649,062 | 3/1987 | Kosiorek et al. | 522/80 |
| 4,844,604 | 7/1989 | Bishop et al. | 522/97 |
| 5,013,768 | 5/1991 | Kiriyama et al. | 522/81 |

*Primary Examiner*—Marion E. McCamish
*Assistant Examiner*—Susan Berman
*Attorney, Agent, or Firm*—Armstrong, Westerman, Hattori, McLeland & Naughton

[57] ABSTRACT

This invention provides:
(i) an acitve energy beam-curable composition for coating the surface of optical fibers therewith, the composition comprising about 100 parts by weight of an active energy beam-curable substance, about 0.5 to about 100 parts by weight of a particulate substance having a mean particle size of about 0.2 to about 200 μm and optionally a photopolymerization initiator;
(ii) a coated optical fiber prepared by applying the composition of item (i) to the surface of an optical fiber and curing the coating;
(iii) a bundle-type optical fiber cable prepared using the coated optical fiber of item (ii);
(iv) an optical fiber unit of the tape type prepared by applying the composition of item (i) to optical fibers and curing the coating; and
(v) an optical fiber prepared using the optical fiber unit of item (iv).

7 Claims, No Drawings

ACTIVE ENERGY BEAM-CURABLE COMPOSITION CONTAINING PARTICLES AND COATED OPTICAL FIBER

The present invention relates to an active energy beam-curable composition and more particularly to an active energy beam-curable composition capable of forming a coating of proper slip property on the outer surface of optical fibers.

Optical fiber units of the tape type for transmitting optical signals are known which comprise two or more optical fibers arranged in parallel with each other and covered with an outer coat (unit coat) comprising one or more layers to provide an integral assembly. Optical cables formed with optical fiber units of the tape type pose the following problem. If high frictional resistance exists between the optical fiber units or between the unit and a structural material for holding the units in the cable, the optical fiber cable when bent during the manufacture or during the installation of the cable undergoes insufficient relaxation of elongation or contraction so that stress is locally applied on the cable, resulting in the occurrence of micro-bends and the increase of transmission loss.

On the other hand, optical fiber cables of the bundle type incur the following disadvantage. If there is high frictional resistance between the optical fibers or between the fiber and the structural material for retaining the fibers in the cable, an optical fiber cable of the bundle type when bent is locally subjected to stress because of the poor slip property of optical fibers and is broken.

To avoid the problems resulting from the poor slip property and the friction, various techniques have been usually used which include, for example, the application of fine powder to the surface of optical fibers or optical fiber units of the tape type, the application of silicone-type or fluorine-type oil to the surface thereof and the increase of the surface hardness of optical fibers or optical fiber units.

However, these techniques give the following disadvantages. The application of fine powder onto the optical fibers or optical fiber units of the tape type necessitates a procedure for applying the fine powder thereover, and faces the risk of polluting the work environment in view of use of fine powder during application, hence a serious obstacle to production of optical fibers in a pollution-free environment.

The application of silicone-type or fluorine-type oil on the surface of optical fibers or optical fiber units of the tape type for increase of slip property requires an additional procedure for application of oil, and disadvantageously renders the surface sticky.

The increase of surface hardness of optical fibers generally reduces the elongation ratio of coating and impairs the elasticity of optical fibers, optical fiber units of the tape type or the like.

It is an object of the present invention to provide a curable composition capable of giving a coating of suitable slip property on the outer surface of optical fibers.

It is another object of the invention to provide a curable composition which can easily form a coating on the outer surface of optical fibers without polluting the work environment during the application of the composition.

Other objects and features of the invention will become apparent from the following description.

According to the invention, there is provided an active energy beam-curable composition for coating the surface of optical fibers therewith, the composition comprising about 100 parts by weight of an active energy beam-curable substance, about 0.5 to about 100 parts by weight of a particulate substance having a mean particle size of about 0.2 to about 200 μm and optionally a photopolymerization initiator.

The curable composition of the present invention is curable by application of active energy beams such as electron beams, ultraviolet rays or the like, and thus can easily form a coating over the outer surface of optical fibers. The coating formed from the composition of the invention has a surface finely projected and dented by the presence of particulate substance of specific particle size and is suitably elastic, therefore slippery.

The active energy beam-curable substance for use in the invention is at least one substance selected from active energy beam-curable resins, active energy beam-curable vinyl monomers and active energy beam-curable oligomers.

Examples of active energy beam-curable resins useful in the invention are resins prepared by condensing a polyester and acrylic or methacrylic acid, ethylenically unsaturated group-containing polyurethane resins, ethylenically unsaturated group-containing epoxy resins, ethylenically unsaturated group-containing phosphorus-containing epoxy resins, ethylenically unsaturated group-containing acrylic resins, ethylenically unsaturated group-containing silicone resins, ethylenically unsaturated group-containing melamine resins and like ethylenically unsaturated group-containing resins.

Ethylenically unsaturated group-containing resins include, for example, those having preferably about 0.1 to about 5.0 moles, more preferably about 0.3 to about 3.0 moles, of ethylenically unsaturated groups per 1,000 g of the resin.

Polymerizable unsaturated monomers can be used as the active energy beam-curable vinyl monomers. Examples of useful polymerizable unsaturated monomers are esterification products of acrylic or methacrylic acid with a monohydric alcohol having 1 to 28 carbon atoms such as methyl acrylate, methyl methacrylate, ethyl acrylate, ethyl methacrylate, n-butyl acrylate, n-butyl methacrylate, iso-butyl acrylate, iso-butyl methacrylate, tert-butyl acrylate, tert-butyl methacrylate, propyl acrylate, propyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate, cyclohexyl acrylate, cyclohexyl methacrylate, stearyl acrylate, stearyl methacrylate and the like; vinyl aromatic compounds such as styrene, vinyltoluene, methylstyrene, chlorostyrene, divinylbenzene and the like; carboxyl-containing monomers such as acrylic acid, methacrylic acid and the like; hydroxyl-containing monomers such as 2-hydroxyethyl acrylate, 2-hydroxyethyl methacrylate, 2-hydroxypropyl acrylate, 2-hydroxypropyl methacrylate and the like; adducts of the above hydroxyl-containing monomer with such polyisocyanate as butyl isocyanate, phenyl isocyanate or the like; adducts of the above hydroxyl-containing monomer with phosphoric acid; unsaturated monomers having a nitrogen-containing heterocyclic ring such as vinylpyrrolidone, vinylpyridine and the like; and other vinyl compounds such as vinyl acetate, vinyl chloride, vinyl isobutyl ether, methyl vinyl ether, acrylonitrile, 2-ethylhexyl vinyl ether and the like.

Useful active energy beam-curable oligomers are polymerizable unsaturated oligomers and include, for example, diethylene glycol diacrylate, diethylene glycol dimethacrylate, polyethylene glycol diacrylate, polyethylene glycol dimethacrylate, propylene glycol diacrylate, propylene glycol dimethacrylate, 1,3-butanediol diacrylate, 1,3-butanediol dimethacrylate, 1,4-butanediol diacrylate, 1,4-butanediol dimethacrylate, neopentyl glycol diacrylate, neopentyl glycol dimethacrylate, 1,6-hexanediol diacrylate, 1,6-hexanediol dimethacrylate, trimethylolpropane triacrylate, trimethylolpropane trimethacrylate, pentaerythritol triacrylate, pentaerythritol trimethacrylate, pentaerythritol tetraacrylate, pentaerythritol tetramethacrylate and like di-, tri- or tetra-vinyl compounds; reaction products prepared by reacting acrylic and/or methacrylic acid with an adduct of the above polyhydric alcohol with ethylene oxide; reaction products prepared by reacting acrylic and/or methacrylic acid with an adduct of the above polyhydric alcohol with propylene oxide; reaction products prepared by reacting acrylic and/or methacrylic acid with an adduct of the above polyhydric alcohol with ε-caprolactone; phosphorus-containing polymerizable unsaturated oligomers; etc.

According to the present invention, the above active energy beam-curable resins, vinyl monomers and oligomers are usable singly or at least two of them can be used in mixture as the active energy beam-curable substance. Preferably the active energy beam-curable resin is used in mixture with at least one of the active energy beam-curable vinyl monomer and oligomer in a ratio by weight of the resin to the latter in the range of from about 20 : about 80 to about 90 : about 10.

The particulate substance for use herein has a mean particle size of about 0.2 to about 200 μm, preferably about 1 to about 50 μm, and can be either inorganic or organic.

Examples of useful inorganic particulate substances are particles of silica, calcium carbonate, talc, mica, clay, barium sulfate, ceramics or metallic oxides.

Organic resin particles useful in the invention can be any of particles of polyamide, acrylic resin, polyethylene, polypropylene, polycarbonate, polyurethane, epoxy resin, polyethylene terephthalate, polyvinylidene fluoride, polytetrafluoroethylene, silicone resin and like resins. The resins insoluble in the active energy beam-curable substance are suitable to achieve the objects of the invention.

Use of particulate substance having a particle size of less than 0.2 μm imparts a poor slip property, whereas use of particulate substance with a particle size of over 200 μm aggravates the surface irregularities of coating, causing high transmission loss by the lateral pressure, hence unsuitable to achieve the objects of the invention. It is more desirable that the particle size of the particulate substance be in the range of 1/20 to 1 times the dry thickness of the coating.

Preferably the Young's modulus of particulate substance for use herein is equal to or close to that of the binder portion of the coating formed by curing the active energy beam-curable substance. If the Young's modulus of the particulate substance is too low, the Young's modulus of the coating is markedly reduced and the coating strength is decreased. On the other hand, if the Young's modulus of the particulate substance is too high, the Young's modulus of the coating is greatly increased, and the elongation ratio is decreased. It is desirable that the particulate substance generally have a Young's modulus of about 0.5 to about 500 kgf/mm$^2$.

The surface of the particulate substance for use herein may be coated with a coupling agent or activated to enhance the adhesion to the binder and to increase the strength of the coating.

Useful coupling agents include those heretofore known such as silicone type agent, metal chelate type agent containing titanium, aluminum, zirconium or like metals, etc. The activation can be done by treatment using plasma, ozone, acid, alkali or the like or by exposure to corpuscular radiation.

The amount of the particulate substance used is about 0.5 to about 100 parts by weight per 100 parts by weight of the active energy beam-curable substance. Use of less than 0.5 part by weight of the particulate substance imparts reduced slip property, whereas use of more than 100 parts by weight of the particulate substance gives a brittle coating, hence unsuitable.

The composition of the invention is curable by application of electron beams, ultraviolet rays or like active energy beams. When the composition is cured by exposure to ultraviolet rays, the composition needs to contain a photopolymerization initiator. Examples of useful photopolymerization initiators include those commonly employed which produce radicals on excitation by ultraviolet-ray irradiation such as benzoin, benzoin methyl ether, benzoin ethyl ether, benzoin n-propyl ether, benzoin isopropyl ether, benzoin n-butyl ether, α-hydroxyisobutyl phenone, benzophenone, p-methylbenzophenone, Michler's ketone, anthraquinone, 2-methylanthraquinone, phenyldisulfide, 2-nitrofluorene and the like. These photopolymerization initiators are usable singly or at least two of them can be used in mixture. The amount of the initiator used is about 0.1 to about 10 parts by weight per 100 parts by weight of the active energy beam-curable substance.

A photosensitization accelerator may be used conjointly with the photopolymerization initiator to accelerate the photopolymerization reaction initiated by the initiator. The photosensitization accelerator for use herein include, for example, triethylamine, triethanolamine, 2-dimethylaminoethanol and like tertiary amine type accelerators; triphenylphosphine and like alkylphosphine type accelerators; and β-thiodiglycol and like thioether type accelerators; etc. These photosensitization accelerators are usable singly or at least two of them can be used in mixture. The amount of the photosensitization accelerator used is preferably about 0.1 to about 10 parts by weight per 100 parts by weight of the active energy beam-curable substance.

When the composition is cured by exposure to electron beams, the photopolymerization initiator and the photosensitization accelerator need not be used.

When required, the composition of the invention may contain an agent for improving the slip property and silicone-type or fluorine-type additives, and may further incorporate therein a coloring pigment, saturated resin, solvent and the like in an amount which does not adversely affect the curing of the composition.

Usable slip property improvers are silicone-type, fluorine-type, polyethylene wax-type, polypropylene wax-type and like slipping agents commonly employed. Specific examples of silicone-type slipping agents are BYK-300 (product of Bic Marinecrot Co., Ltd.) and TSF4700 (product of Toshiba Silicone Co., Ltd.). Specific examples of fluorine-type slipping agents are "Unidyne DS402" (trademark, product of Daikin Industries, Ltd.) and the like. The slip property improver is preferably used in an amount of about 0.01 to about 10 parts by weight per 100 parts by weight of the active energy beam-curable substance.

The composition of the invention is curable by exposure to electron beams, ultraviolet rays or like active energy beams.

Electron beam sources for curing the composition by electron beam irradiation are electron beam generators such as Cockcroft, Cockcroft-Walton, van de Graaff, resonance transformer, transformer, insulating core transformer, dynamitron, linear filament and high-frequency Electron beam generators, etc. In this case, a suitable dose of electron beam to be applied is about 1 to about 20 megarads although variable depending on the film thickness and the like. Preferably electron the beam is irradiated in an inert gas atmosphere.

Useful ultraviolet ray sources include a mercury lamp, xenon lamp, carbon arc, metal halide lamp, sunlight and the like. While ultraviolet rays can be applied without any specific limitation on conditions, preferably light beams containing ultraviolet rays at a wavelength of about 150 to about 450 nm are applied in air or in an inert gas atmosphere.

The composition of the invention is suitably usable for forming a coating on the outer surface of optical fibers which require a slip property. For example, in case of optical fiber units of the tape type, the composition is used for covering optical fibers or for forming a unit coat on the outer surface of arranged optical fibers to be formed into a optical fiber unit of the tape type. In case of optical fiber cables of the bundle type, the composition is used for coating the outer surface of optical fibers. The thickness of the coating formed from the composition, which is not specifically limited, is suitably about 2 to about 500 μm in coating an optical fiber and about 5 to about 500 μm in forming a unit coat for a optical fiber unit of the tape type.

The composition of the invention is cured by application of active energy beams and can easily form a coating on the outer surface of optical fibers without polluting the work environment. The coating from the composition has a suitable elasticity and fine surface irregularities, and exhibits an adequate slip property which would prevent partial build-up of stress. Therefore the optical fibers with the outer surface coated with the composition involve only low transmission loss and would be unlikely to break and be high in durability, even when bent during the manufacture or the installation of optical cables.

The present invention will be described below in greater detail with reference to the following Examples and Comparison Examples in which the parts are all by weight unless otherwise specified.

EXAMPLE 1

An ultraviolet ray-curable composition (I) was prepared by mixing together 70 parts of Gohselack UV-7000B (trade name for active energy beam-curable urethane acrylate resin, product of The Nippon Synthetic Chemical Industry Co., Ltd.), 30 parts of trimethylolpropane triacrylate, 4 parts of 1-hydroxy-1-cyclohexylacetophenone as a photopolymerization initiator and 10 parts of talc particles having a mean particle size of about 10 μm.

The obtained ultraviolet ray-curable composition (I) was applied onto five optical fibers to form a unit coat thereon, the five optical fibers being arranged in parallel with each other to form an integral assembly of the tape type, each optical fiber having an outside diameter of 300 μm, comprising a core of 5 μm diameter and a cladding of 130 μm diameter and being covered with a primary coat and a secondary coat and externally colored. The unit coat was cured by exposure to ultraviolet ray from a metal halide lamp at a dose of 10 mJ/cm$^2$ in an atmosphere containing oxygen in a concentration of up to 500 ppm, giving a coated optical fiber unit of the tape type having a width of 1.6 mm and a thickness of 0.4 mm. The obtained optical fiber units of the tape type showed an excellent slip property when superposed on each other.

An optical cable was produced which had at each of six positions four optical fiber units of the tape type superposed on each other, namely the cable being composed of 120 optical fibers. Two transmission loss tests were carried out using a 100 m length of the obtained fiber cable wound into a coil of 1 m diameter and using the same length of cable in a straight state. The test results showed that the wound cable caused transmission loss higher by 0.2 dB/km, i.e. only slightly higher, than the straight cable.

EXAMPLE 2

The same procedure as in Example 1 was repeated with the exception of using 10 parts of Orgasol 2002D (trade name for Nylon 12, about 20 μm in mean particle size, about 200 kgf/mm$^2$ in Young's modulus, product of Ato Chem, France) in place of 10 parts of talc used in Example 1, giving an ultraviolet ray-curable composition (II).

The ultraviolet ray-curable composition (II) was applied by a die coater to optical fibers each comprising a core of 90 μm diameter and a cladding of 100 μm diameter to form a coating of about 30 μm thickness. The coating was cured by exposure to ultraviolet ray from a high pressure mercury lamp at a dose of 5 mJ/cm$^2$ in an atmosphere of nitrogen gas, giving an optical fiber covered with a single coat.

A optical fiber cable of the bundle type (2 m length) was produced from the obtained optical fiber for use as an image fiber in forming images consisting of 3000 picture elements. The fiber cable was subjected to a test of 100 cycles, each cycle consisting of winding the cable into a coil of 300 mm diameter and unwinding the cable to a straight state. After the test, the optical fiber cable remained entirely unbroken, hence satisfactory in durability.

EXAMPLE 3

An ultraviolet ray-curable composition (III) was prepared in the same manner as in Example 2 with the exception of further adding 0.5 part of BYK-300 (trade name for a silicone-type slip property improver, product of Bic.Marinecrot Co., Ltd.).

The same subsequent procedure as in Example 1 was repeated with the exception of using the ultraviolet ray-curable composition (III) in place of the ultraviolet ray-curable composition (I) used in Example 1, giving a optical fiber unit of the tape type. The obtained optical fiber units showed a good slip property when superposed over each other.

An optical fiber cable comprising 120 optical fibers was produced in the same manner as in Example 1 with the exception of using the obtained optical fiber unit of the tape type. Two transmission loss tests were conducted using a 100 m length of the cable wound into a coil of 1 m diameter and using the same length of the cable in a straight state. The wound cable caused transmission loss higher by 0.1 dB/km, i.e. only slightly higher, than the straight cable.

EXAMPLE 4

An electron beam-curable composition (IV) was produced in the same manner as in Example 2 with the exception of not using 1-hydroxy-1-cyclohexylacetophenone as a photopolymerization initiator.

The electron beam-curable composition (IV) was applied by a die coater to an optical fiber comprising a core of 90 μm diameter and a cladding of 100 μm diameter r. to a thickness of about 30 μm. The coating was cured by exposure to electron beams at an accelerating voltage of 150 KV at a dose of 1 megarad in an atmosphere of nitrogen gas, giving an optical fiber covered with a single coat.

An optical fiber cable of the bundle type (2 m length) was produced from the obtained optical fiber for use as an image fiber in forming images consisting of 3000 picture elements. The cable was subjected to a test of 100 cycles, each cycle consisting of winding the cable into a coil of 300 mm diameter and unwinding the cable to a straight state. After the test, the optical fiber cable remained entirely unbroken, hence satisfactory in durability.

COMPARISON EXAMPLE 1

An ultraviolet ray-curable composition (V) was prepared in the same manner as in Example 1 with the exception of not using 10 parts of talc. The same subsequent procedure as in Example 1 was repeated with the exception of using the ultraviolet ray-curable composition (V) in lieu of the ultraviolet ray-curable composition (I), giving an optical fiber unit of the tape type. The optical fiber units of the tape type exhibited poor slip property when superposed over each other. An optical fiber cable comprising 120 optical fibers was produced in the same manner as in Example 1 with the exception of using the obtained optical fiber unit of the tape type. Two transmission loss tests were carried out using a 100 m length of the obtained fiber cable wound into a coil of 1 m diameter and using the same length of cable in a straight state. The test results showed that the wound cable caused transmission loss higher by 3 dB/km, i.e. much higher, than the straight cable, hence defective in contrast with the cables tested in Examples 1 to 4.

COMPARISON EXAMPLE 2

The same procedure as in Example 2 was repeated with the exception of using the ultraviolet ray-curable composition (V) prepared in Comparison Example 1 in place of the ultraviolet ray-curable composition (II), giving an optical fiber cable of the bundle type having a length of 2 m for use as an image fiber for forming images consisting of 3000 picture elements. The cable was subjected to a test of 100 cycles, each cycle consisting of winding the cable around a 300 mm diameter and unwinding the cable to a straight state. The cable was found to have broken at a ratio of 3%, hence defective.

We claim:

1. A coated optical fiber prepared by the steps of:
   applying a coating of an active energy beam-curable composition to the surface of an optical fiber, the composition comprising about 100 parts by weight of an active energy beam-curable substance selected from the group consisting of ethylenically unsaturated group-containing resins, ethylenically unsaturated monomers, and ethylenically unsaturated oligomers, and about 0.5 to about 100 parts by weight of a particulate substance having a means particle size of about 1 to about 50 μm and selected from the group consisting of particles of silica, calcium carbonate, talc, mica, clay, barium sulfate, ceramics, metallic oxides, polyamide, acrylic resin, polyethylene, polypropylene, polycarbonate, polyurethane, epoxy resin, polyethylene terephthalate, polyvinylidene fluoride, polytetrafluoroethylene and silicone resin; and
   curing and coating to give a cured coating containing said particulate substance in the form of particles.

2. A optical fiber cable of the bundle type, prepared using a plurality of coated optical fibers as defined in claim 1.

3. An optical fiber unit of the tape type, prepared by applying the composition of claim 1 to a plurality of optical fibers.

4. An optical fiber cable prepared using the optical fiber unit of the tape type as defined in claim 3.

5. An optical fiber as defined in claim 1, wherein said composition further comprises a photopolymerization initiator.

6. A coated optical fiber as claimed in claim 1, wherein said composition further comprises about 0.01 to about 10 parts by weight of a slip property improver per 100 parts by weight of the active energy beam-curable substance.

7. A coated optical fiber as claimed in claim 1, wherein said particulate substance has a Young's modulus of about 0.5 to about 500 kgf/mm$^2$.

* * * * *